(12) United States Patent
Van Thourhout et al.

(10) Patent No.: US 10,591,672 B2
(45) Date of Patent: Mar. 17, 2020

(54) POLARIZATION INDEPENDENT PROCESSING IN INTEGRATED PHOTONICS

(71) Applicants: UNIVERSITEIT GENT, Ghent (BE); IMEC VZW, Leuven (BE)

(72) Inventors: Dries Van Thourhout, Ghent (BE); Andrea Trita, Pasadena, CA (US)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 15/324,836

(22) PCT Filed: Jul. 8, 2015

(86) PCT No.: PCT/EP2015/065536
§ 371 (c)(1),
(2) Date: Jan. 9, 2017

(87) PCT Pub. No.: WO2016/005418
PCT Pub. Date: Jan. 14, 2016

(65) Prior Publication Data
US 2017/0205578 A1    Jul. 20, 2017

(30) Foreign Application Priority Data
Jul. 8, 2014    (EP) .................................. 14176093

(51) Int. Cl.
*G02B 6/12*    (2006.01)
*G02B 6/28*    (2006.01)
(Continued)

(52) U.S. Cl.
CPC ......... *G02B 6/126* (2013.01); *G02B 6/12004* (2013.01); *G02B 6/124* (2013.01);
(Continued)

(58) Field of Classification Search
CPC .................................. G02B 6/12; G02B 6/28
(Continued)

(56) References Cited

U.S. PATENT DOCUMENTS

| | | | | |
|---|---|---|---|---|
| 5,742,418 A | * | 4/1998 | Mizutani | H04B 10/532 372/27 |
| 6,853,758 B2 | * | 2/2005 | Ridgway | G02F 1/0136 359/245 |

(Continued)

FOREIGN PATENT DOCUMENTS

| | | |
|---|---|---|
| EP | 1241499 A1 | 9/2002 |
| EP | 1353200 A2 | 10/2003 |
| EP | 1363200 A2 | 11/2003 |

OTHER PUBLICATIONS

Halir et al., "Reducing Polarization-Dependent Loss of Silicon-on-Insulator Fiber to Chip Grating Couplers", IEEE Photonics Technology Letters, vol. 22, No. 6, Mar. 15, 2010, pp. 389-391.
(Continued)

*Primary Examiner* — Kaveh C Kianni
(74) *Attorney, Agent, or Firm* — Workman Nydegger

(57) ABSTRACT

A photonic integrated circuit comprises an input interface adapted for receiving an optical input signal and splitting it into two distinct polarization modes and furthermore adapted for rotating the polarization of one of the modes for providing the splitted signals in a common polarization mode,. The PIC also comprises a combiner adapted for combining the first mode signal and the second mode signal into a combined signal and a decohering means adapted for transforming at least one of the first mode signal and the second mode signal such that the first mode signal and the second mode signal are received by the combiner in a mutually incoherent state. A processing component for receiving and processing said combined signal is also comprised.

9 Claims, 13 Drawing Sheets

(51) Int. Cl.
  *G02B 6/126* (2006.01)
  *G02B 6/27* (2006.01)
  *G02B 6/124* (2006.01)
  *G02F 1/01* (2006.01)
  G02B 6/34 (2006.01)
  G02B 6/293 (2006.01)

(52) U.S. Cl.
  CPC ......... *G02B 6/2726* (2013.01); *G02B 6/2766* (2013.01); *G02B 6/2773* (2013.01); *G02B 6/2786* (2013.01); *G02B 6/2861* (2013.01); *G02F 1/011* (2013.01); *G02B 6/293* (2013.01); *G02B 6/34* (2013.01); *G02B 2006/1215* (2013.01); *G02F 2203/50* (2013.01)

(58) Field of Classification Search
  USPC .............................................. 385/2
  See application file for complete search history.

(56) References Cited

U.S. PATENT DOCUMENTS

| | | | | |
|---|---|---|---|---|
| 7,702,188 | B2* | 4/2010 | Little | G02B 6/1228 385/28 |
| 8,676,003 | B2* | 3/2014 | Roelkens | G02B 6/29397 385/14 |
| 2004/0008916 | A1 | 1/2004 | Ridgway et al. | |
| 2008/0031566 | A1* | 2/2008 | Matsubara | G02B 6/12007 385/14 |
| 2010/0046886 | A1* | 2/2010 | Doerr | G02B 6/105 385/27 |
| 2010/0303476 | A1* | 12/2010 | Barton | H04B 10/505 398/212 |
| 2011/0243556 | A1* | 10/2011 | Nagarajan | H04B 10/40 398/43 |
| 2012/0002971 | A1* | 1/2012 | Doerr | G02B 6/124 398/115 |
| 2013/0142476 | A1* | 6/2013 | Dallesasse | G02B 6/26 385/11 |
| 2014/0153862 | A1* | 6/2014 | Picard | G02B 6/1228 385/11 |
| 2016/0033728 | A1* | 2/2016 | Kish, Jr. | G02B 6/272 385/14 |
| 2017/0108649 | A1* | 4/2017 | Dallesasse | G02B 6/2746 |

OTHER PUBLICATIONS

Sacher et al., "Polarization Rotator-Splitters in Standard Active Silicon Photonics Platforms", Optical Society of America, vol. 22, No. 4, Feb. 24, 2014, 10 Pages.

Van Laere et al., "Nanophotonic Polarization Diversity Demultiplexer Chip", Journal of Lightwave Technology, vol. 27, No. 4, Feb. 15, 2009, pp. 417-425.

Vermeulen et al., "High Efficiency Broadband Polarization Rotator on Silicon-On-Insulator", IEEE, 2010, pp. 42-44.

Wang et al., "Ultrasmall Si-Nanowire-Based Polarization Rotator", Optical Society of America, vol. 25, No. 5, May 2008, pp. 747-753.

Watts et al., "Integrated Mode-Evolution-Based Polarization Rotators", Optics Letters, vol. 30, No. 2, Jan. 15, 2005, pp. 138-140.

International Search Report from PCT Application No. PCT/EP2015/065536, dated Sep. 22, 2015.

European Search Report from EP Application No. EP14176093.4, dated Jan. 12, 2015.

\* cited by examiner

POLARIZATION INDEPENDENT PROCESSING IN INTEGRATED PHOTONICS

FIELD OF THE INVENTION

The invention relates to the field of photonic integrated circuits. More specifically it relates to photonic integrated circuit components and methods for polarization independent operation of such photonic integrated circuit based on the loss of coherence between orthogonal polarization components of an input signal.

BACKGROUND OF THE INVENTION

The performance of a photonics integrated circuit (PIC) is often polarization-dependent. For example, individual building blocks of a PIC may be specifically designed for a particular polarization. Therefore, for efficient operation of the device, it is known in the art to pre-emptively adjust the polarization of the input signal such as to match the polarization for which the PIC building blocks are designed.

As real life signals are often arbitrarily polarized, it would be advantageous to make the PIC performance of a photonics integrated circuit independent of the polarization status of the input signal, or to at least reduce the impact of polarization on the operation of the photonic device.

One solution for this problem that is known in the art is to adopt a "polarization diversity" approach, e.g. as illustrated in FIG. 1. Assuming a polarization independent interface between an external optical fiber and the PIC, and assuming that the PIC building blocks are for example designed for the TE polarization, this approach for polarization status independent PIC operation comprises splitting the input polarization into two orthogonal polarizations (TE and TM), rotating the TM over 90 degrees such as to transform it into a TE polarization, and then processing the two TE polarizations by means of two identical replicas of the original PIC. The signals can be eventually recombined after one of the two TE polarizations is transformed back into TM. However, this approach has the disadvantage of doubling the PIC real estate, and thus increasing the cost, size and power consumption of the device. Furthermore, processing the two polarizations independently by means of two replicas of the original PIC also has the disadvantage that the two resulting signals will differ due to differences between the two PIC replicas, e.g. due to fabrication tolerances. This affects the quality of the recombined signal at the output of the device.

The PIC interfaces for coupling optical signals in and out of the chip may furthermore be designed for a specific polarization. As a consequence, in order to couple an external signal efficiently into the PIC, the signal polarization must be adjusted such to match the polarization for which the interface is designed. For example, 1D grating couplers may provide an efficient interface between a PIC and an external optical fiber for one specific polarization.

2D grating couplers allow the coupling of an external signal from and to the PIC independently of its polarization, e.g. as disclosed in European Patent Application EP 1353200. Thus, both orthogonal input polarizations may be coupled efficiently into the PIC, while automatically splitting them and rotating one polarization over 90 degrees. Thus the approach illustrated in FIG. 1 can be implemented using 2D grating couplers as IN/OUT chip interfaces, e.g. as illustrated in FIG. 2. Such 2D grating couplers have the advantage of implementing automatically the polarization splitting and polarization rotation, which otherwise would have to be implemented using integrated polarization splitters and rotators. Such integrated splitters and rotators as known in the art may have a poor on chip-performance. Nevertheless, the problem of signal impairment due to the fabrication differences between the two PIC replicas used to process the two polarizations independently remains present.

SUMMARY OF THE INVENTION

It is an object of embodiments of the present invention to provide simple and efficient means and methods for operating a photonics integrated circuit device designed for polarization dependent operation in a polarization independent manner.

The above objective is accomplished by a method and device according to the present invention.

It is an advantage of embodiments of the present invention that a polarization dependent photonics integrated circuit device may be transformed into a polarization independent device in a simple and efficient manner.

It is an advantage of embodiments of the present invention that a compact polarization independent photonics integrated circuit device can be provided, e.g. without requiring duplication of polarization dependent components, such that PIC real estate is conservatively used.

It is an advantage of embodiments that signal impairment due to simultaneous signal processing of orthogonal polarization components of the input signal in two imperfect replicas of the same PIC design is avoided.

It is an advantage of embodiments that a simple and passive approach is provided for polarization independent operation of a PIC for narrowband signals, e.g. an input signal having a signal bandwidth greater than 10 pm, e.g. greater than 100 pm, at a wavelength of 1550 nm.

It is an advantage of embodiments that polarization independence can be achieved at a low signal magnitude cost, e.g. at a low cost of less than 10 dB loss of signal intensity, e.g. less than 7 dB, or even a loss as low as about 3 dB.

The present invention relates to a photonic integrated circuit, comprising an input interface adapted for receiving an optical input signal and splitting the optical input signal into a first mode signal and a second mode signal respectively corresponding to two distinct polarization modes of the optical input signal, a rotator for rotating the polarization of at least one of the first mode signal and the second mode signal such as to provide the first mode signal and the second mode signal in a common polarization mode, e.g. a common linear polarization mode, a combiner adapted for combining the first mode signal and the second mode signal into a combined signal, a decohering means adapted for transforming at least one of the first mode signal and the second mode signal such that the first mode signal and the second mode signal are received by the combiner in a mutually incoherent state, and a processing component for receiving and processing said combined signal.

The input interface may be adapted for receiving the optical input signal from an external single-mode optical fiber.

The input interface may for example comprise a light coupling means for coupling the optical input signal from an external source into an integrated waveguide, a polarisation splitting means for splitting the optical input signal coupled into the integrated waveguide into the first mode signal and the second mode signal, e.g. such that each mode signal is propagating in a corresponding waveguide. The rotator may form part of the input interface or may be separate therefrom.

The input interface may comprise a 2-dimensional diffraction grating structure.

The decohering means may comprise a first waveguide and a second waveguide for respectively conducting the first mode signal and the second mode signal in said common polarization mode, the first waveguide and the second waveguide differing in optical path length by at least a coherence length of the optical input signal.

The photonic integrated circuit may comprise an output interface for coupling an output signal provided by the processing component out of the photonics integrated circuit.

The decohering means may comprise a phase modulator adapted for modulating the phase of one of the first mode signal and the second mode signal at a rate higher than a predetermined detection bandwidth for sampling an output signal provided by the processing component.

The combiner may comprise a 3 dB coupler adapted for combining the first mode signal and the second mode signal into the combined signal.

The rotator may be part of the input interface or the coupler. The rotator may also be split to perform part of the rotation before the decohering means and part of the rotation thereafter. The rotator may alternatively be positioned only in between the input interface and the decohering means or only in between the decohering means and the combiner.

The present invention also relates to a method for operating a photonic integrated circuit, the method comprising obtaining an optical input signal, splitting the optical input signal into a first mode signal and a second mode signal respectively corresponding to two distinct polarization modes of the optical input signal, transforming at least one of the first mode signal and the second mode signal such that the first mode signal and the second mode signal are in mutually incoherent states, prior or after said transforming, rotating the polarization of at least one of the first mode signal and the second mode signal such as to provide the first mode signal and the second mode signal in a common polarization mode, combining the first mode signal and the second mode signal into a combined signal in said common polarization mode, and processing said combined signal by a processing component of the photonic integrated circuit.

Said transforming may comprise transmitting the first mode signal and the second mode signal over respectively a first optical path and a second optical path, said first optical path and said second optical path differing in optical path length by at least a coherence length of the optical input signal.

The method further may comprise coupling an output signal provided by said processing out of the photonics integrated circuit.

Said transforming may comprise modulating the phase of one of the first mode signal and the second mode signal at a rate higher than a predetermined detection bandwidth for sampling an output signal provided by said processing.

Said splitting may comprise splitting the optical input signal on a 2D diffraction grating structure.

Splitting the optical input signal may comprise introducing the first mode signal and the second mode signal in separate waveguides so that both the first mode signal and the second mode signal propagates as the common polarization mode in said separate waveguides.

Particular and preferred aspects of the invention are set out in the accompanying independent and dependent claims.

Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
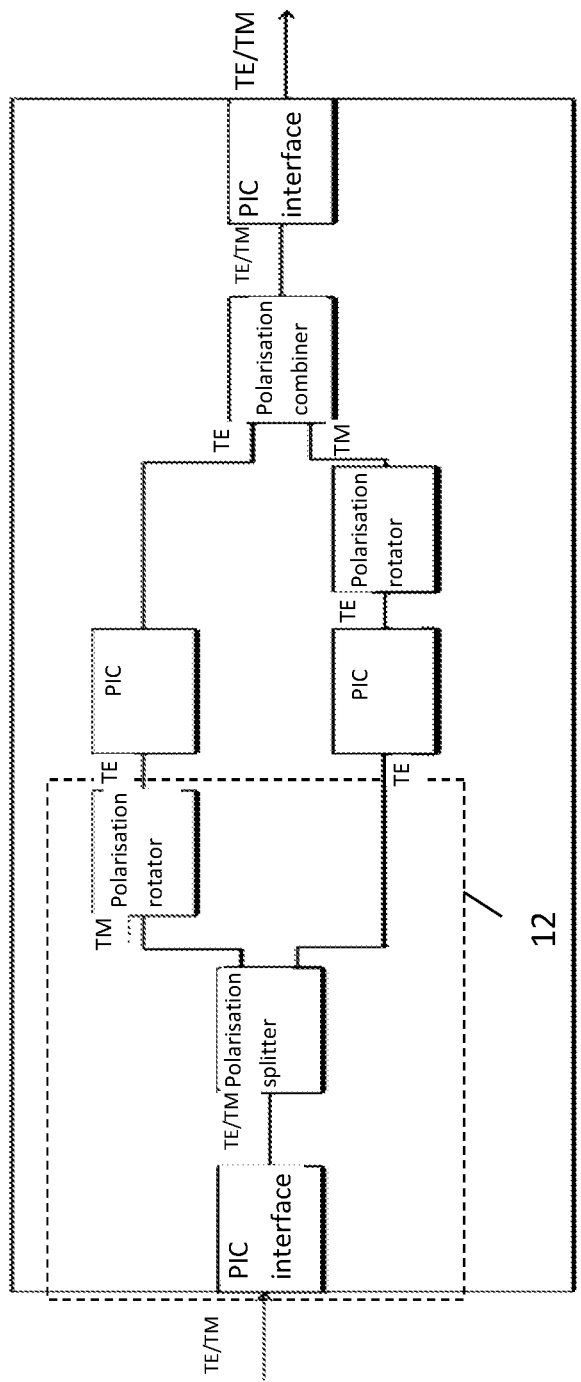
FIG. 1 illustrates a first polarization diversity approach to obtain polarization independent processing in a polarization dependent photonic integrated circuit according to a method known in the art.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

It is well known that in a fiber, the optical polarisation can be described as two orthogonal linearly polarised modes, such that light propagating through the fibre will have a total field in an elliptical state of polarisation. Furthermore, the state of polarisation may change during propagation in a real fibre due to polarisation mode dispersion.

The present invention relates to an approach for efficiently processing an input optical signal, e.g. an input signal in an elliptical polarization state such as for example provided by a single-mode fiber, in a polarization independent manner on a photonics integrated circuit (PIC) comprising polarization dependent components, e.g. for operating a polarization dependent PIC component block in a polarization independent manner. In accordance with embodiments of the present invention, two polarization states of an input signal may be simultaneously processed by PIC components adapted for efficiently processing only a single polarization mode.

Whereas in embodiments illustrating the devices and methods of the present invention reference is made to a silicon on insulator (SOI) material system, embodiments of the present invention are not limited thereto and relate to use of any suitable platform for implementing photonics integrated circuits (PIC). Examples of suitable photonics integrated circuits are high index contrast optical passive material platforms, such as for example an SOI material system, silicon, germanium, silicon germanium, silicon nitride, silicon carbide, etc. Silicon-on-Insulator is a very interesting material system for highly integrated photonic circuits. The high refractive index contrast allows photonic waveguides and waveguide components with submicron dimensions to guide, bend and control light on a very small scale so that various functions can be integrated on a chip. Such waveguides allow a high level of miniaturization, which is advantageous. Furthermore for such waveguide types radiation can be efficiently coupled in and out the photonics integrated circuit. Using Silicon-on-insulator also has some technological advantages. Due to the CMOS industry, silicon technology has reached a level of maturity that outperforms any other planar chip manufacturing technique by several orders of magnitude in terms of performance, reproducibility and throughput. Nano-photonic ICs can be fabricated with wafer scale-processes, which means that a wafer can contain a large number of photonic integrated circuits. Combined with the commercial availability of large wafers at a relative moderate cost, this means that the price per photonic integrated circuit can be very low.

Where in embodiments of the present invention reference is made to a decoherence means, reference is made to a means inducing modes to be combined being no longer coherent at the point of combining them because, for example, in the precedent structure before the point of combining the waves, one or more of the following steps has been performed: the path length difference of the two modes in the waveguides was larger than the coherence length, the group velocity of two modes in a single waveguide was sufficiently different such that after passing through this waveguide both modes are delayed with respect to each other over a length longer than the coherence length, or one of the modes has been frequency shifted. The latter may for example be caused by one of the waveguides having an integrated frequency shifter such as for example an acousto-optical modulator (low frequencies) or a thermo-optical modulator (low frequencies) or an electro-optical modulator. In one example, the decoherence means may be a frequency shifter for example an acousto-optical modulator that shifts the frequency over a few MHz.

In a first aspect, the present invention relates to a photonic integrated circuit comprising an input interface adapted for receiving an optical input signal and splitting the optical input signal into a first mode signal and a second mode signal respectively corresponding to two distinct polarization modes of the optical input signal. The system furthermore comprises a rotator adapted for rotating the polarization of at least one of the first mode signal and the second mode signal such as to provide the first mode signal and the second mode signal in a common polarization mode, e.g. to align the polarization orientation of the first mode signal and the second mode signal. The common polarization mode may be a common, polarization mode, but embodiments of the present invention are not limited thereto. The photonics integrated circuit further comprises a combiner adapted for combining the first mode signal and the second mode signal into a combined signal and a decohering means adapted for transforming at least one of the first mode signal and the second mode signal such that the first mode signal and the second mode signal are received by the combiner in a mutually incoherent state, e.g. such that a wave interference effect between the first mode signal and the second mode signal is not present or only negligibly present in the combined signal. The photonics integrated circuit further comprises a processing component for receiving and processing said combined signal. The rotator may be part of the input interface, part of the combiner, in between the input interface and the decohering means, in between the decohering means and the combiner or it may be split and be a combination of any of the above possibilities.

Figure 3:
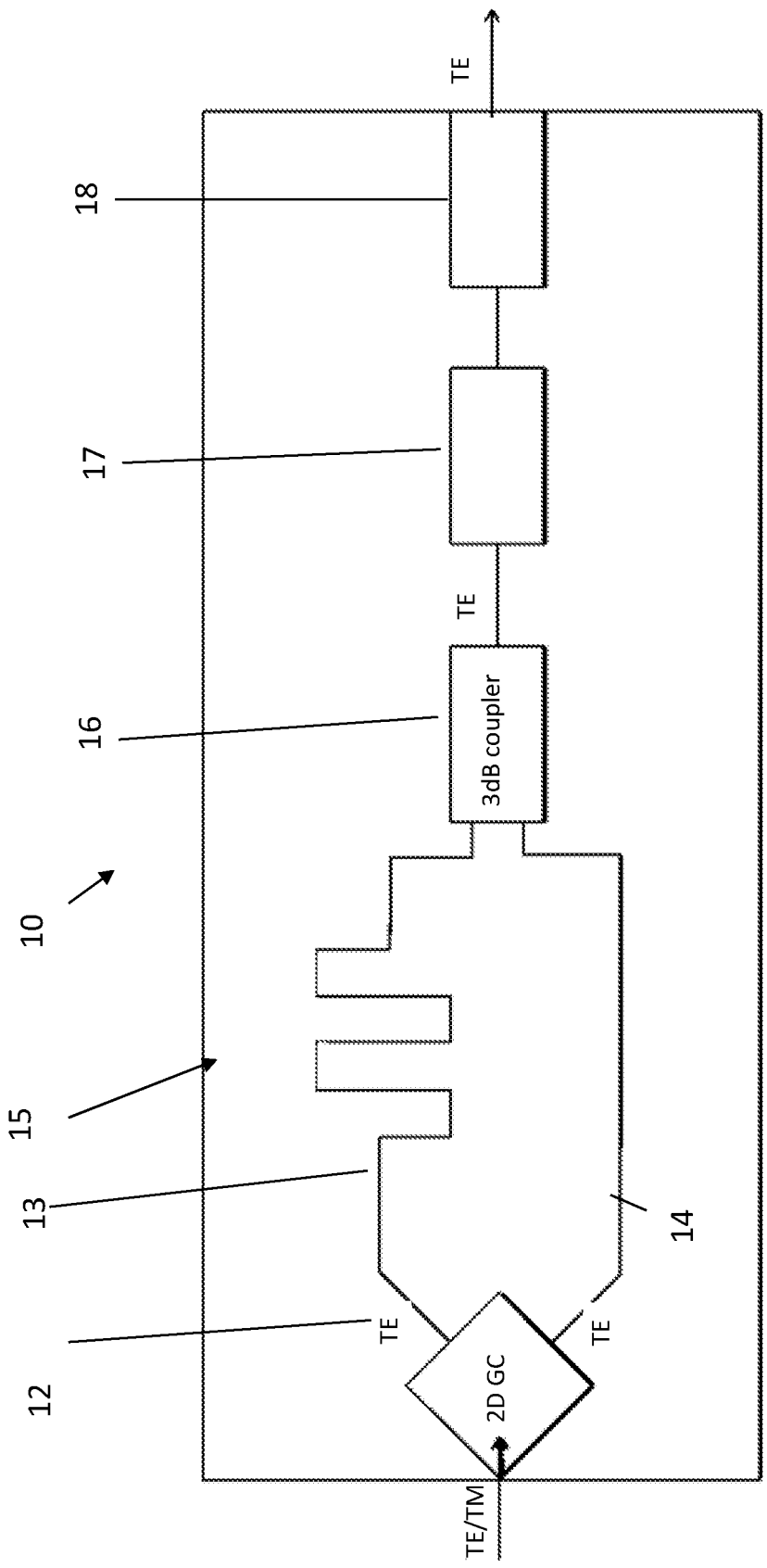
FIG. 3 illustrates a photonic integrated circuit according to a first exemplary embodiment of the present invention.

By way of illustration, embodiments of the present invention not being limited thereto, standard and optional features of embodiments of the present invention will be described with reference to an exemplary photonic integrated circuit 10, as illustrated in FIG. 3, corresponding with an exemplary embodiment of the present invention. The photonic integrated circuit 10 comprises an input interface 12 adapted for receiving an optical input signal having two distinct polarization modes. For example, the input interface 12 may be adapted for receiving the optical input signal from an external source, e.g. from an optical fiber, such as a single-mode optical fiber.

The input interface 12 may for example comprise a light coupling means for coupling the optical input signal from an external source into an integrated waveguide, a polarisation splitting means for splitting the optical input signal coupled into the integrated waveguide into the first mode signal and the second mode signal, e.g. such that each mode signal is propagating in a corresponding waveguide. The rotator may form part of the input interface or may be separate therefrom. The light coupling means may comprise a lens or optical focusing structure for coupling light into the integrated waveguide, or may comprise a grating coupler, a prism coupler, a taper or inverted taper, or other light-coupling structure known in the art suitable for coupling light into an integrated waveguide structure such as lensed fibers or butt coupling means. The polarisation splitting means may comprise an integrated polarisation beam splitter, e.g. 2D grating couplers splitting the light coupled into the chip in two waveguides, one polarisation in each of them; inverted tapers in combination with an on-chip polarization splitter, the on-chip polarization splitter being a directional or adiabatic coupler and eventually an integrated optical rotator, or any other means known in the art suitable for polarisation dependent beam splitting in an integrated photonic circuit.

The input interface may for example comprise a photonic circuit coupler, e.g. a grating coupler. In embodiments according to the present invention, the input interface may comprise a 2-dimensional diffraction grating structure, e.g. a 2-dimensional photonic crystal with square lattice, or a periodic refractive index modulator such as an array of holes and/or rods. The input interface may be a periodic grating structure, e.g. having at most 200 periods, for example at most 100 periods or at most 70 periods. The input interface may thus comprise a coupler coupled to an optical fiber, such that the coupling is polarization independent.

The input interface 12 is furthermore adapted for splitting the optical input signal into a first mode signal and a second mode signal respectively corresponding to the two distinct polarization modes. The input interface 12 is also adapted for rotating the polarization of at least one of the first mode signal and the second mode such as to provide the first mode signal and the second mode signal in a common polarization mode, e.g. such as to align the polarization of said first signal and said second signal to a common polarization mode. In other words, the input interface comprises a rotator for rotating the polarization of at least one of the first mode signal and the second mode such as to provide the first mode signal and the second mode signal in a common polarization mode. As indicated above, the rotator does not need to be integrated in the input interface 12 but can also be integrated in another component or be a separate component in agreement with any of the above described possibilities.

For example, the input interface 12 may be adapted for splitting the optical input signal into two polarization modes such as for example a TE and a TM mode, e.g. modes corresponding to orthogonal polarization modes. The first and second mode signal are then transformed to the same polarization state, e.g. two arbitrary polarization components of an elliptically polarized input signal may be transformed into two TE polarized modes respectively propagating through two waveguide structures of the photonic integrated circuit 10. Thus, the input interface 12 may be adapted for introducing the first mode signal and the second mode signal in separate waveguides such that both modes propagate as the first mode or as the second mode in both waveguides.

The photonic integrated circuit 10 may comprise a first waveguide 13 and a second waveguide 14 for respectively conducting the first mode signal and the second mode signal in the same polarization state, i.e. the common polarization mode, for example a TE mode or a TM mode. Thus, two arbitrary complementary polarization modes may be transformed into two TE polarization propagation mode signals, or two TM polarization propagation mode signals.

Figure 2:
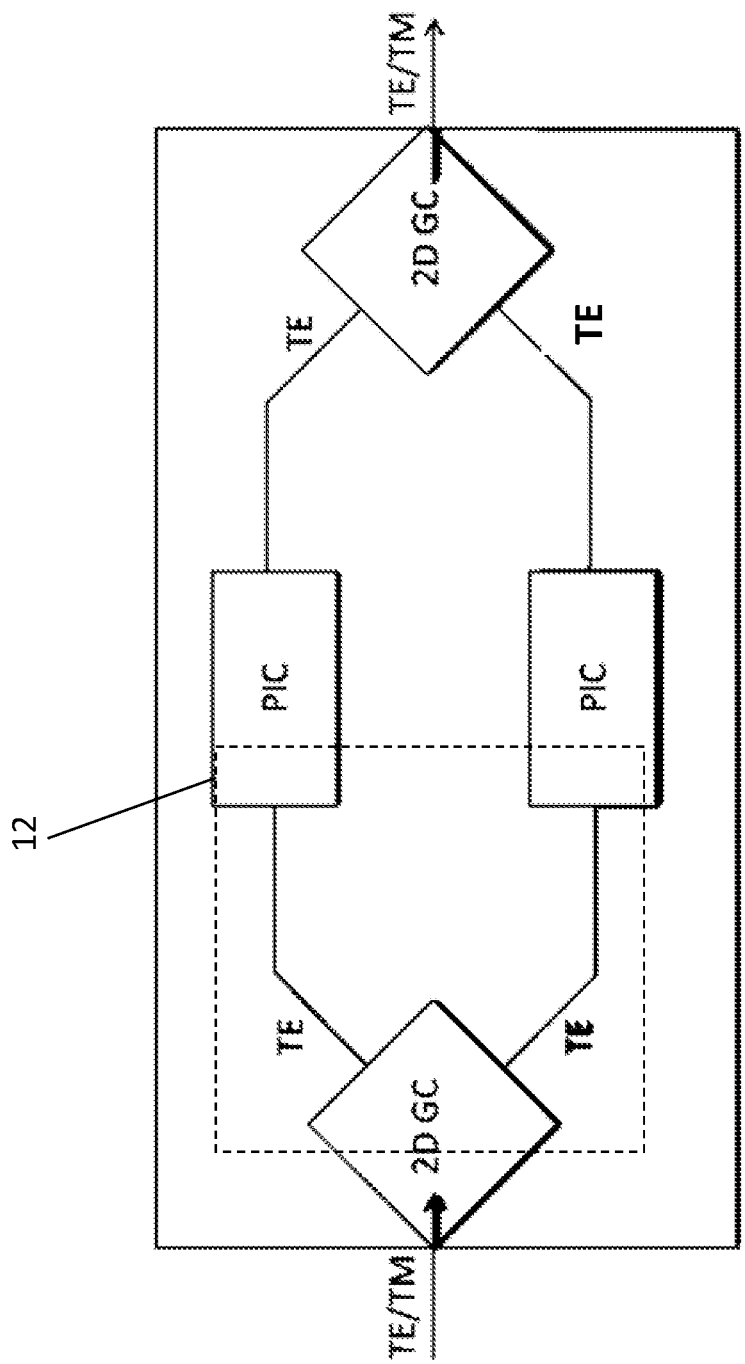
FIG. 2 illustrates a second polarization diversity approach according to a method known in the art.
Figure 4:
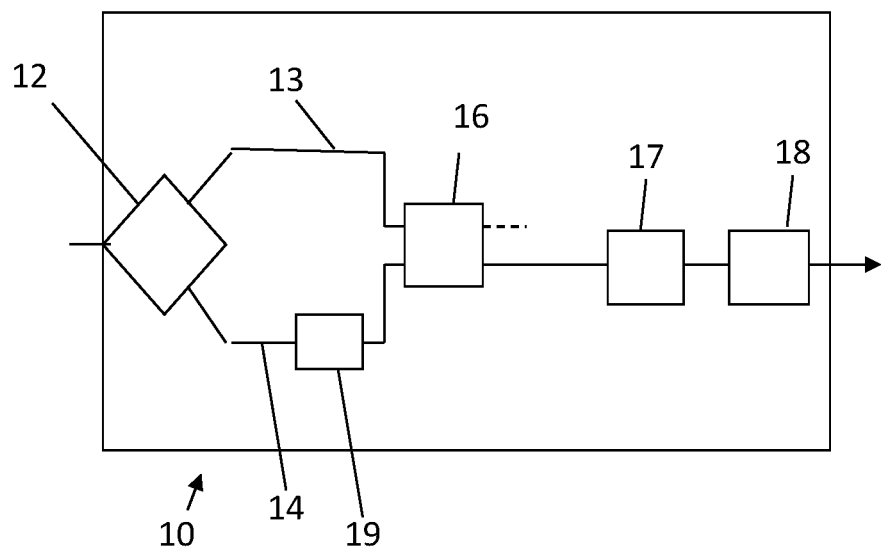
FIG. 4 illustrates a photonic integrated circuit according to a second exemplary embodiment of the present invention.

The input interface 12 may for example comprise a configuration as known in the art, e.g. as illustrated by FIG. 1 and FIG. 2. In an embodiment according to the present invention, the input interface 12 may comprise a polarization independent interface, e.g. fabricated on the substrate hosting the photonics integrated circuit, for coupling the input optical signal, e.g. an arbitrarily polarized signal from an external optical fiber, into an input optical waveguide fabricated on the substrate. Such input interface 12 may furthermore comprise an integrated polarization beam splitter fabricated on the substrate arranged downstream from the input optical waveguide with respect to the direction of light propagation during normal operation. This splitter may split the input signal in two orthogonally polarized signals, which may then propagate through two separate optical waveguides fabricated on the substrate, e.g. the first waveguide 13 and the second waveguide 14. The signal propagating in one of these two optical waveguides may then be further transmitted by an integrated polarization rotator, e.g. fabricated on the substrate, for rotating the polarization by 90 degrees. Thus, the input signal may be transformed into two signals, available at two separate waveguides, having the same polarization, which may be the polarization for which PIC elements of the processing component 17 are designed. These operations summarized hereinabove can be compactly implemented using a 2D grating coupler, for example a 2D grating coupler as disclosed in EP 1353200. The input interface 12 shown in FIG. 3 and FIG. 4 is depicted as such a 2D grating coupler implementing these operations in order to simplify the drawings, however the input interface may comprise other means known in the art to achieve the effects of receiving the input, splitting the input into two mode signals and rotating the polarization of at least one mode signal, as will be clear to the person skilled in the art. As indicated above, rotation of the polarisation of at least one mode signal can also be done at other positions in the photonic integrated circuit.

In accordance with embodiments of the present invention, the first and second mode signals do not need to be processed by means of two independent PIC replicas, unlike prior art methods such as discussed in the background section hereinabove, such that disadvantageous signal impairment due to differences between the PIC replicas, e.g. caused by fabrication tolerances, is avoided and efficient use of PIC real estate can be achieved.

The photonic integrated circuit 10 also comprises a combiner 16 adapted for combining the first mode signal and the second mode signal, e.g. the output of the first waveguide 13 and the output of the second waveguide 14, into a combination signal. The combiner 16 may be a 50:50 optical coupler, e.g. fabricated on the substrate of the photonic integrated circuit. Such 50:50 optical coupler may be adapted for coupling the output of the first waveguide 13 and the second waveguide 14 into a waveguide for supplying the combination signal to a processing component 17. The combiner 16 may for example comprise a 3 dB coupler for coupling a combination of the first mode signal and the second mode signal, e.g. both received in a TE or TM polarization mode after ensuring relative incoherence between these mode signals, into the combination signal which is then supplied to the processing component 17. It thus is to be noticed that the combiner 16 is positioned in the optical path before the processing component 17 of the photonic integrated circuit providing the processing function for which the photonic integrated circuit typically is introduced.

Combinations of, for example, two TE signals supplied by the input interface 12, would result in interference effects in the combined signal, e.g. at the output of a 3 dB coupler, due to the coherence between the two TE signals. Thus the processing component would be fed with an impaired signal and proper operation of the device would be lost. However, the decohering means 15 in embodiments according to the present invention ensures that such disadvantageous interference is avoided.

The photonic integrated circuit 10 comprises a decohering means 15 adapted for transforming at least one of the first mode signal and the second mode signal such that the first mode signal and the second mode signal are received by the combiner in a mutually incoherent state.

The photonic integrated circuit 10 may comprise a processing component 17, e.g. a polarization dependent photonic integrated circuit, for processing the combination signal in the common polarization mode. Hereinbelow, for the sake of simplicity, it may be assumed that the PIC building blocks used for constructing the processing component are designed for TE polarization, which may be considered a typical case, but obviously, the present invention is not limited hereto. For example, the processing component may be adapted for operating efficiently for another polarization mode. The photonics integrated circuit 10 may further comprise an output interface 18 for coupling the output of the processing component 17 out of the photonics integrated circuit, e.g. a 1D grating coupler designed for TE polarization.

In some embodiments according to the present invention, as illustrated in FIG. 3, this decohering means 15 may comprise a first waveguide 13 and a second waveguide 14 for respectively conducting the first mode signal and the second mode signal, e.g. for respectively conducting the first and second mode signal in the same polarization state, i.e. the common polarization mode, for example a TE mode or a TM mode. The first waveguide 13 and the second waveguide 14 may have substantially different lengths, e.g. different lengths. The first waveguide 13 and the second waveguide 14 may differ in optical path length by at least a coherence length of the optical input signal. For example, the input interface 12 may be adapted for receiving an optical input signal having a predetermined coherence length, e.g. the photonics integrated circuit may be adapted to operate on light supplied by a laser source, a laser diode source or another at least partially coherent light source characterized by a particular coherence length when propagating through the photonics integrated circuit.

When one of the two mode signals is delayed by a path length longer than the coherence length of the input signal transmitted into the PIC, no interference is produced at the output of the combiner 16, e.g. the 3 dB coupler. Thus, independently of its polarization status, the input signal is transformed into a single polarization mode combined signal, e.g. at the cost of predetermined fixed intensity loss of about 3 dB. The combined signal, e.g. in a TE mode, can then be properly processed by the processing component 17, e.g. which may be designed for TE polarization operation.

The length of the delay path, e.g. the difference in optical path length between the first waveguide 13 and the second waveguide 14, may be longer than the coherence length of the input signal. The coherence length $L_c$ for a signal with spectral width $\Delta\lambda$, is equal to $$L_c = \frac{2\ln(2)}{\pi n}(\lambda^2/\Delta\lambda).$$

For example, on a Silicon on Insulator (SOI) platform, a signal with spectral width $\Delta\lambda=0.1$ nm transmitted by the circuit may results in a coherence length $L_c$ of about 3 mm. Therefore, it is feasible to integrate such delay path on a SOI PIC.

In addition to a power penalty due to the combiner, e.g. a fixed 3 dB loss, propagation losses are incurred by the delay waveguide. A typical value for the propagation losses on an integrated optical waveguides may be in the order of 1 dB/cm, e.g. on a SOI platform. Thus, this additional power penalty induced by propagation in the longer arm may be considered negligible.

In some embodiments according to the present invention, the decohering means 15 may comprise a phase modulator, e.g. fabricated on the substrate of the photonic integrated circuit. A narrowband optical input signal, e.g. a signal generated by a laser, may require impractical delay path lengths in order to achieve decoherence in accordance with the delay line embodiment discussed hereinabove. However, to achieve the same effect, the decohering means 15 may also comprise a phase modulator 19 adapted to modulate the phase of one of the first mode signal and the second mode signal at a rate faster than the detection bandwidth of the observer. Thus, the modulator 19 may be adapted for modulating the phase of one of the first and second mode signal at a rate higher than a predetermined detection bandwidth for sampling an output signal provided by the processing component 17. As phase modulators can be operated at several tens of GHz, a suitable number for the maximum operating speed of the proposed scheme can be 1 GHz.

A typical example of phase modulator is a Lithium-Niobate electro-optic modulator. The applied external electric field changes the refractive index of the optical waveguide and thus induces a phase change on the propagating optical field. In Silicon photonics platform, the refractive index change (which in turn result in a phase change) can be induced by varying the carrier density in the optical waveguide by means of PN junctions. Modulation speeds of more than 10 GHz have been demonstrated using such modulators. An alternative involves the deposition of an electro-optically active material, such as electrooptically active polymers or electrooptically active ferro-electric materials and depositing suitable electrodes.

In order to illustrate theoretical principles of a second exemplary embodiment comprising such phase modulator 19, as shown in FIG. 4, the invention not being intended by such theoretical considerations, consider a Mach-Zehnder interferometer composed by the input interface 12, e.g. a 2D grating coupler coupling light into the first 13 and second waveguide 14, and the combiner, e.g. a 3 dB coupler. The power transmission of this interferometer can be written as:

$$I_{PIC} = \left[\frac{I_1(\lambda)}{2} + \frac{I_2(\lambda)}{2} + \sqrt{I_1(\lambda)I_2(\lambda)} \sin(\Delta\phi_{IN} + \Delta\phi_M)\right]$$

Where $I_1(\lambda)=k_1(\lambda)I_{IN}(\lambda)$ and $I_2(\lambda)=k_2(\lambda)I_{IN}(\lambda)$ are the powers of the two mode signals, e.g. both propagating in TE mode, transmitted by the 2D grating coupler. $k_1(\lambda)$ and $k_2(\lambda)$ correspond to the power coupling efficiencies of the two waveguides respectively and are functions of the input signal wavelength and polarization. $\Delta\phi_{IN}$ is the phase difference between the two on-chip mode signals, which depends on the polarization status impinging on the 2D grating coupler. $\Delta\phi_M$ is the additional phase imposed by the phase modulator on the signal propagating through the second waveguide 14.

The signal transmitted by the Mach-Zehnder interferometer further propagates through the processing component 17, which has a transfer function $T(\lambda)$, which may then be coupled out of the chip by an output interface 18, e.g. a 1D grating coupler having power efficiency $k_{OUT}(\lambda)$ or can be detected on-chip, e.g. by Germanium detectors monolithically integrated with the PIC. The output signal can thus be written as:

$$I_{OUT}(\lambda) = \left[\frac{I_1(\lambda)}{2} + \frac{I_2(\lambda)}{2} + \sqrt{I_1(\lambda)I_2(\lambda)} \sin(\Delta\phi_{IN} + \Delta\phi_M)\right]T(\lambda)k_{OUT}(\lambda)$$

By periodically modulating the phase of the signal propagating through the second waveguide 14, the term $\sin(\Delta\phi_{IN}+\Delta\phi_M)$ in $I_{out}$ can average out to substantially zero.

If the phase modulator is operated at a rate faster than the detection bandwidth of an observer receiving an output signal from the processing component, the observer will detect only the average value of total transmitted signal which corresponds to:

$$I_{OUT}(\lambda) = \left[\frac{I_1(\lambda)}{2} + \frac{I_2(\lambda)}{2}\right]T(\lambda)k_{OUT}(\lambda)$$
$$= [k_1(\lambda) + k_2(\lambda)]\frac{I_{IN}(\lambda)}{2}T(\lambda)k_{OUT}(\lambda)$$
$$= \frac{I_{IN}(\lambda)}{2}k_{IN}(\lambda)T(\lambda)k_{OUT}(\lambda)$$

Where $[k_1(\lambda)+k_2(\lambda)]=k_{IN}(\lambda)$ is the total power coupled into the PIC by the 2D grating coupler. This means that at the expense of for example a 3 dB loss, the operation of the device, e.g. of the processing component 17 designed specifically for e.g. TE operation, can be made polarization independent. This approach is particularly advantageous for a narrowband input signal.

In a second aspect, the present invention relates to a method for operating a photonic integrated circuit, e.g. for operating a polarization dependent processing component on a PIC in a polarization independent manner. Details relating to this second aspect of the invention may be provided hereinabove in relation to the first aspect of the invention, since a photonic integrated circuit according to embodiments of the first aspect of the invention is adapted for implementing steps of a method according to embodiments of the second aspect when in operation. Therefore, the method also may comprise additional optional steps corresponding with a functionality of one of the components of the photonic integrated circuit according to an embodiment of the first aspect.

Figure 10:
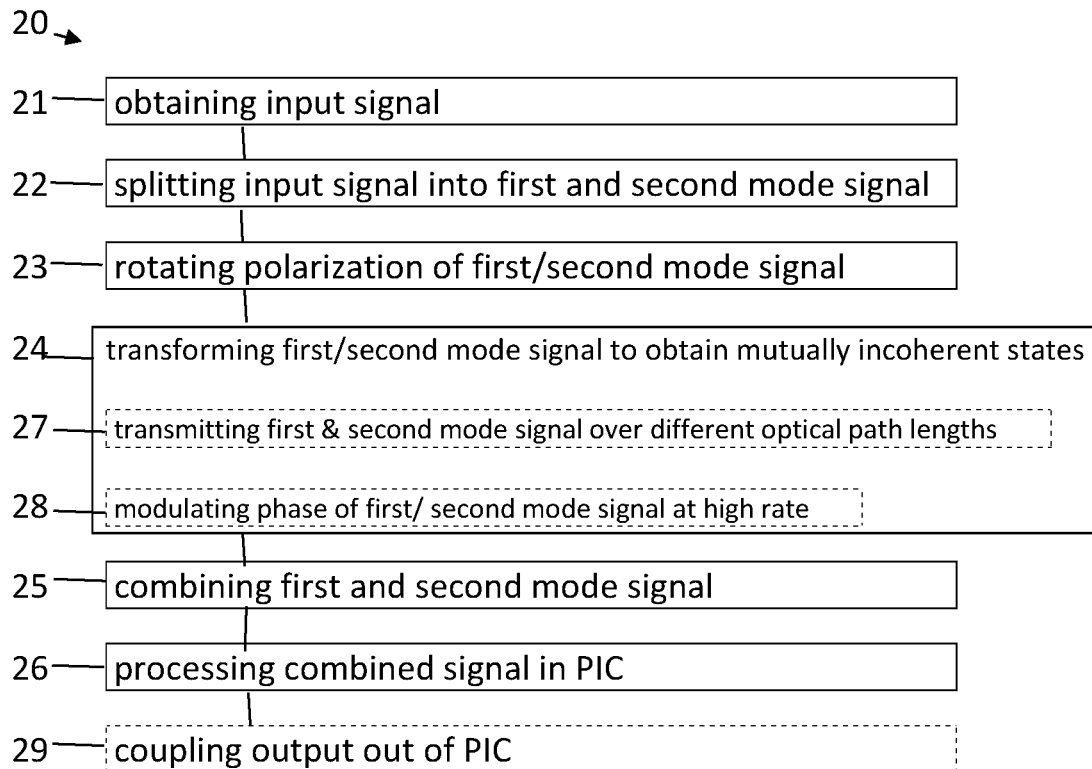
FIG. 10 illustrates a method according to embodiments of the present invention.

FIG. 10 illustrates a method 20 according to embodiments of the present invention. The method 20 comprises obtaining 21 an optical input signal, e.g. coupling light into a photonic device. The method further comprises splitting 22 the optical input signal into a first mode signal and a second mode signal respectively corresponding to two distinct polarization modes of the optical input signal. Splitting 22 the optical input signal may comprise splitting the optical input signal on a 2D diffraction grating structure. Splitting 22 the optical input signal may also comprise introducing the first mode signal and the second mode signal in separate waveguides so that both the first mode signal and the second mode signal propagate as the common polarization mode in said separate waveguides.

The method 20 further comprises rotating 23 the polarization of at least one of the first mode signal and the second mode signal such as to provide the first mode signal and the second mode signal in a common polarization mode. This rotation can be done before and/or after the transforming.

The method 20 also comprises transforming 24 at least one of the first mode signal and the second mode signal such that the first mode signal and the second mode signal are in mutually incoherent states. For example, this transforming 24 may comprise transmitting 27 the first mode signal and the second mode signal over respectively a first optical path and a second optical path. The first optical path and the second optical path differ in optical path length by at least a coherence length of the optical input signal.

Transforming 24 may alternatively or additionally also comprise modulating the phase of one of the first mode signal and the second mode signal at a rate higher than a predetermined detection bandwidth for sampling an output signal provided by the processing.

The method 20 further comprises combining 25 the first mode signal and the second mode signal into a combined signal in the common polarization mode.

The method 20 also comprises processing 26 the combined signal by a processing component of the photonic integrated circuit.

The method 20 may also comprise coupling 29 an output signal provided by this processing out of the photonics integrated circuit.

Examples relating to embodiments of the present invention are described hereinbelow. These examples are provided for informative purposes, in order to assist in reducing the invention to practice and to provide insight into particular aspects and advantages of the present invention. The invention is not intended to be limited by such examples.

The example discussed hereinbelow relates to a miniaturized Fiber Bragg Grating (FBG) sensor interrogator. A FBG sensor is a grating inscribed in a short segment of an optical fiber that reflects particular wavelengths of light while transmitting substantially all other wavelengths. The peak wavelength position of the signal reflected by the grating is proportional to the strain applied to the sensor. Thus by measuring the peak wavelength position of the reflected light it is possible to have information about the strain applied to the sensor.

Figure 5:
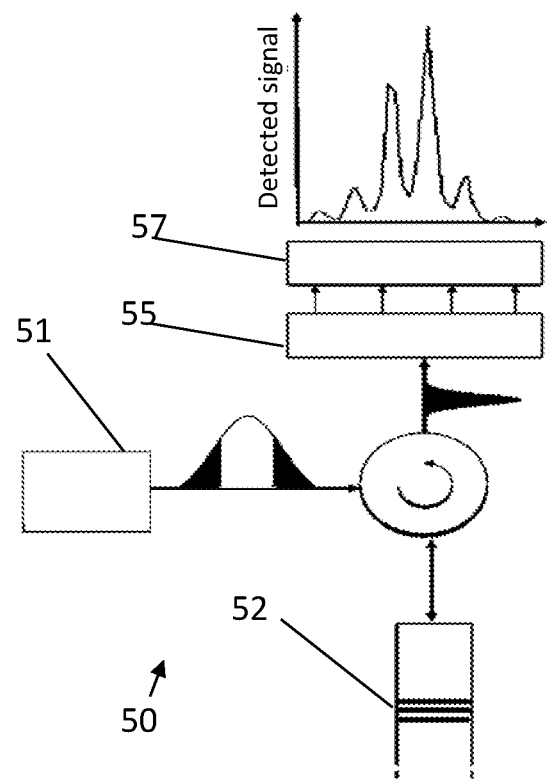
FIG. 5 shows a fiber Bragg grating interrogator in an example for illustrating embodiments of the present invention.
Figure 11:
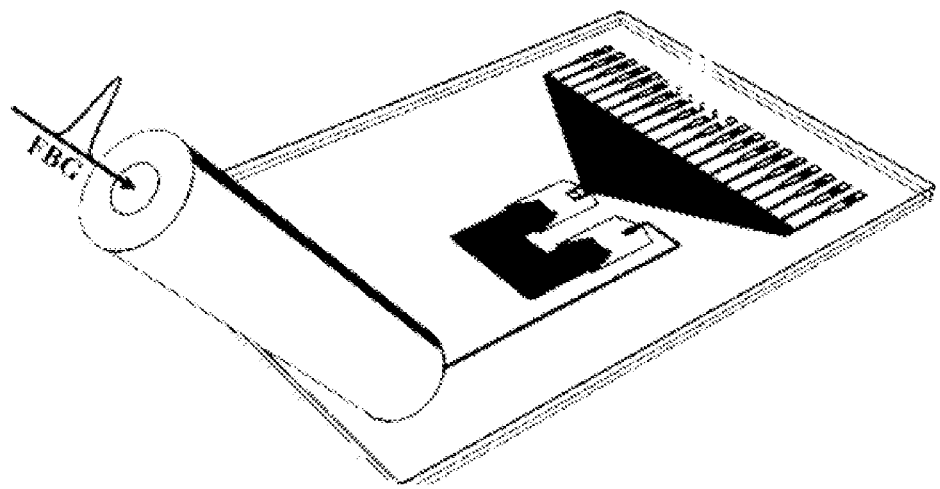
FIG. 11 shows a fiber Bragg grating interrogator in an example for illustrating embodiments of the present invention.
Figure 12:
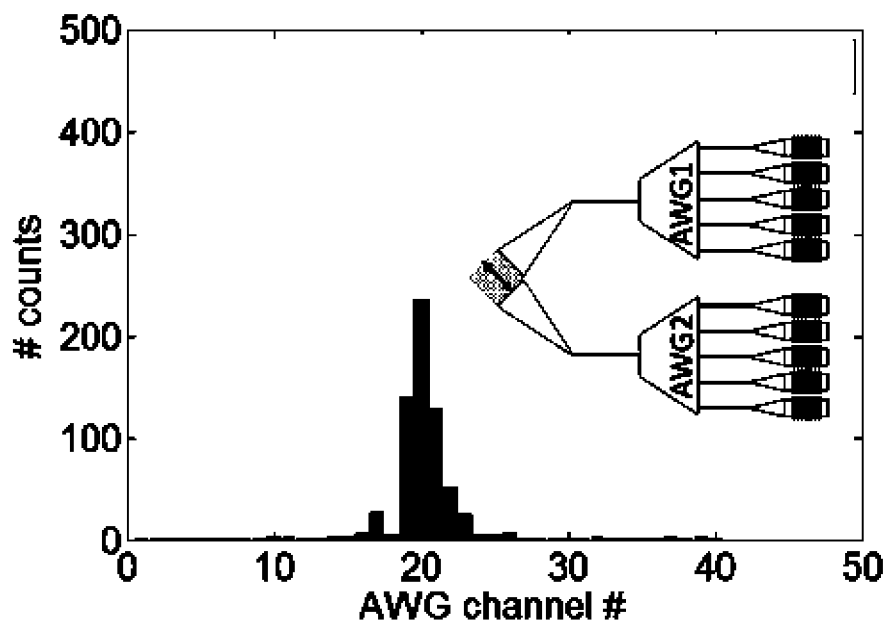
FIG. 12 shows TE transmission characteristics for a first arrayed waveguide grating AWG1 of the fiber Bragg grating interrogator illustrated in FIG. 6, in an example for illustrating embodiments of the present invention.
Figure 13:
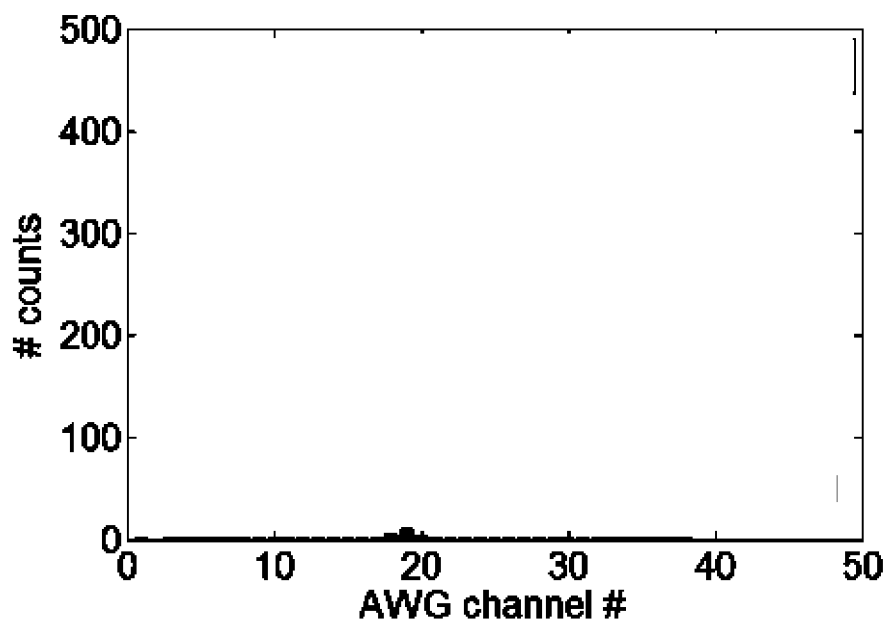
FIG. 13 shows TE transmission characteristics for a second arrayed waveguide grating AWG2 of the fiber Bragg grating interrogator illustrated in FIG. 6, in an example for illustrating embodiments of the present invention.
Figure 14:
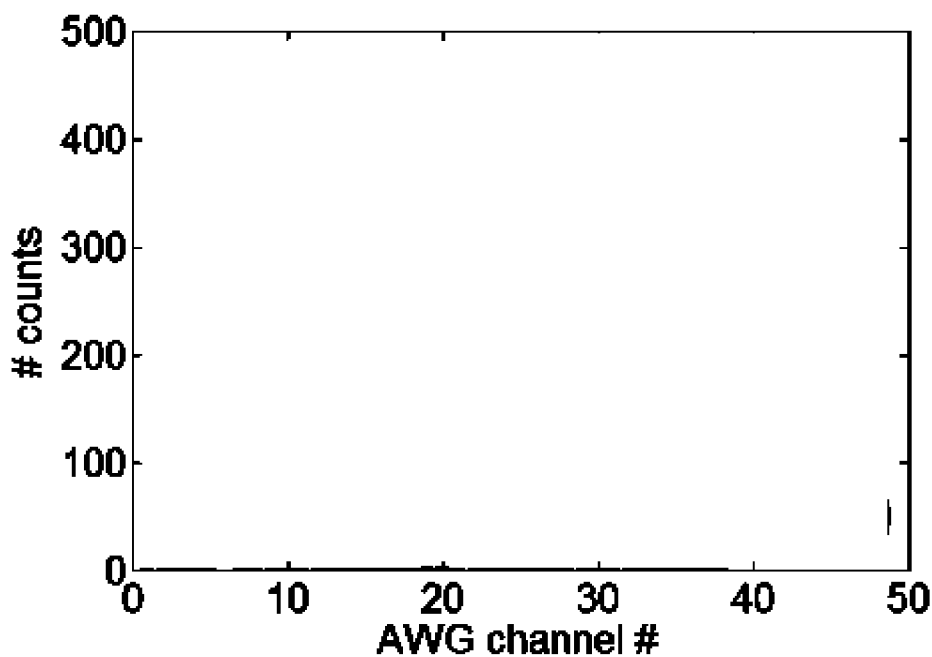
FIG. 14 shows TM transmission characteristics for a first arrayed waveguide grating AWG1 of the fiber Bragg grating interrogator illustrated in FIG. 6, in an example for illustrating embodiments of the present invention.
Figure 15:
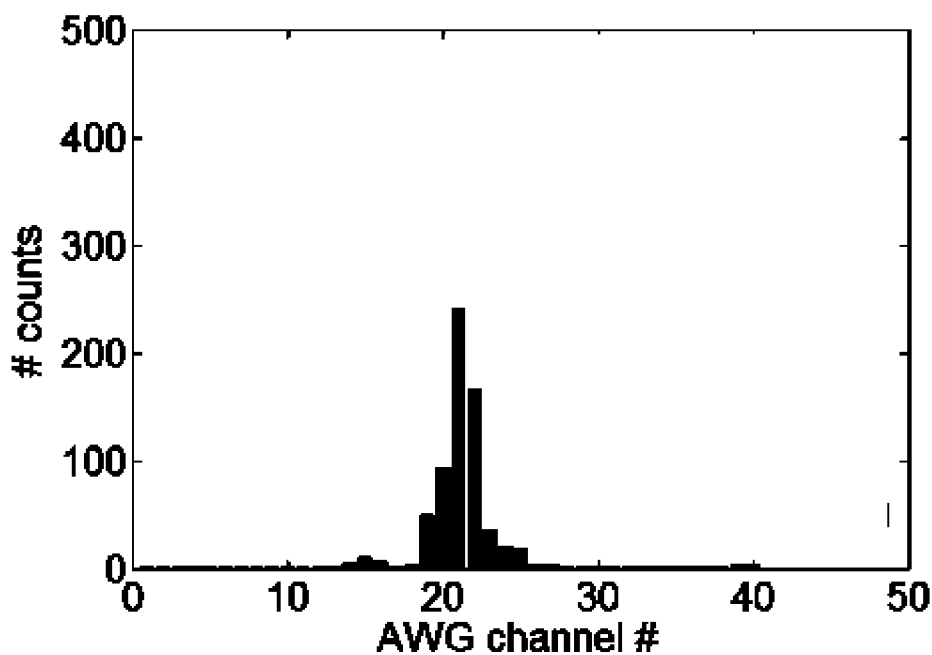
FIG. 15 shows TM transmission characteristics for a second arrayed waveguide grating AWG2 of the fiber Bragg grating interrogator illustrated in FIG. 6, in an example for illustrating embodiments of the present invention.

This FBG interrogator is based on a photonic integrated circuit implemented on the SOI platform. The basic architecture of the system is illustrated in FIG. 5 and FIG. 11.

The FBG sensor 50 is illuminated by a broadband light source 51. Only a small portion of the incoming light is reflected by the FBG 52. This reflected signal is processed by a photonic integrated circuit 55 and the resulting signal is revealed by an array of detectors 57. The detected electrical signal can be used to track the peak wavelength of the signal reflected by the FBG.

The PIC 55 is designed to work for TE polarization. The bandwidth of the signal reflected by the FBG is in the order 0.1 nm. The polarization status of the signal reflected by the FBG, input to PIC, is unknown.

The exemplary FBG interrogator is based on an arrayed waveguide grating (AWG) filter. An AWG is a device that can separate (or combine) signals at different wavelength. Conversely to conventional AWG for Wavelength Division Multiplexing where low adjacent channel crosstalk is sought, this AWG features an intentional large crosstalk between the channels, which allows the FBG peak under test to produce a measurable output signal over several channels. Prior knowledge of the AWG channel position $\lambda_{CH\_i}$, combined with power values transmitted by the AWG channels $P_{CH\_i}(\lambda_{FBG})$, allows estimating the center of mass of the FBG peak under test using the Center Of Gravity (CoG) detection technique.

An AWG is composed of two free propagation regions (FPRs), designed to provide focusing functionality, connected together by an array of waveguides featuring a constant incremental optical path difference, equal to an integer multiple of the center wavelength of the demultiplexer $\lambda_c$. Light diffracted from the input port, after travelling the first FPR, is coupled into an array of delay waveguides and then further propagates through the second FPR, finally reaching the output port. For the center wavelength $\lambda_c$ the fields in the delay waveguides arrive at the output aperture with equal phase and thus the field distribution at the output aperture is a replica of the field at the input aperture. For $\lambda \neq \lambda_c$ the increasing length of the delay waveguides results in a linear phase change across their outputs. This phase delay induces a tilt in the phase fronts propagating in the second FPR and thus a shift of the focal point along the image plane. By proper positioning the receiver waveguides along the image plane, spatial separation of the input wavelengths is achieved.

The spectral response of the AWG channels is determined by the overlap of the shifted field profile with the mode profile of the different output waveguide located at the image plane.

In conventional AWG design the input and output aperture waveguides have the same cross section. This results in maximal overlap (and thus low insertion losses) when the field on the image plane is aligned with one of the output waveguide apertures and steep roll off of the channel response for small wavelength deviations with respect to the corresponding center wavelength of the channel. This in turn implies a very small cross talk between adjacent channels, which is highly favorable in the case of (de)multiplexer applications for example, where a sharp separation of the input spectrum is desired. One way to achieve a large crosstalk between the AWG channels is to reduce the distance between the output waveguides on the image plane. This approach, however, proves to be not very successful as there is a physical limit to the minimum distance between the output waveguides, and little channel spectral superposition can be achieved, especially for non nearest neighboring channels. To attain the required large superposition the device was designed with different input/output waveguide apertures. In particular a larger waveguide aperture is used at the input side with respect to the output side. As a consequence, a large image is produced on the output focal plane, overlapping several receiver waveguides and providing the required channel superposition. This result, of course, comes at expenses of a reduced peak channel transmission (as the input signal is now partly transmitted through the neighboring overlapping channels).

The exemplary device was fabricated on a 200 mm Silicon on Insulator (SOI) wafer featuring 220 nm Si slab on top of 2 um buried oxide layer (BOX). The patterns are defined using 193 nm deep UV lithography in combination with a double etch process. A deep 220 nm etch was used to define high confinement photonic wires. A shallow 70 nm etch was used to define the grating couplers for IN/OUT coupling of the chip and to define the low contrast waveguides interfacing with the star coupler regions. Low contrast waveguides are used at the star-coupler interfaces such to reduce the reflections at the transition point. To cover the 50 nm target measurement range for the FBG interrogator, the AWG is designed with 50 channels spaced by 1 nm. The set free spectral range is also 50 nm, thus the device operates as a router. An array of 150 waveguides, tapered to 2 µm at the star coupler interfaces, and spaced by 0.2 um, connects the two FPR. The input waveguide, a 450 nm wide photonic wire, is tapered to 5 µm using a 200 µm long adiabatic taper before reaching the first FPR. At the exit of the second FPR, shallow waveguides with 1 µm aperture are used, which are connected to the output waveguides (again 450 nm wide photonic wires) using a 25 µm long adiabatic taper. An input/output aperture width ratio of 5 is thus set, which ensures that the image of the input aperture on the focal plane overlaps several output waveguides.

The operating principle of the present FBG example allows simultaneous interrogation of multiple FBGs at the same time. Indeed, the total measurement range can be split in a series of non overlapping measurement intervals. Each measurement interval is associated with one FBG and is processed independently. Clearly with this approach there is a trade-off between the number of FBGs and the measurement range for each FBG: the product of these two must be less or equal to the total measurement range (50 nm).

Figure 7:
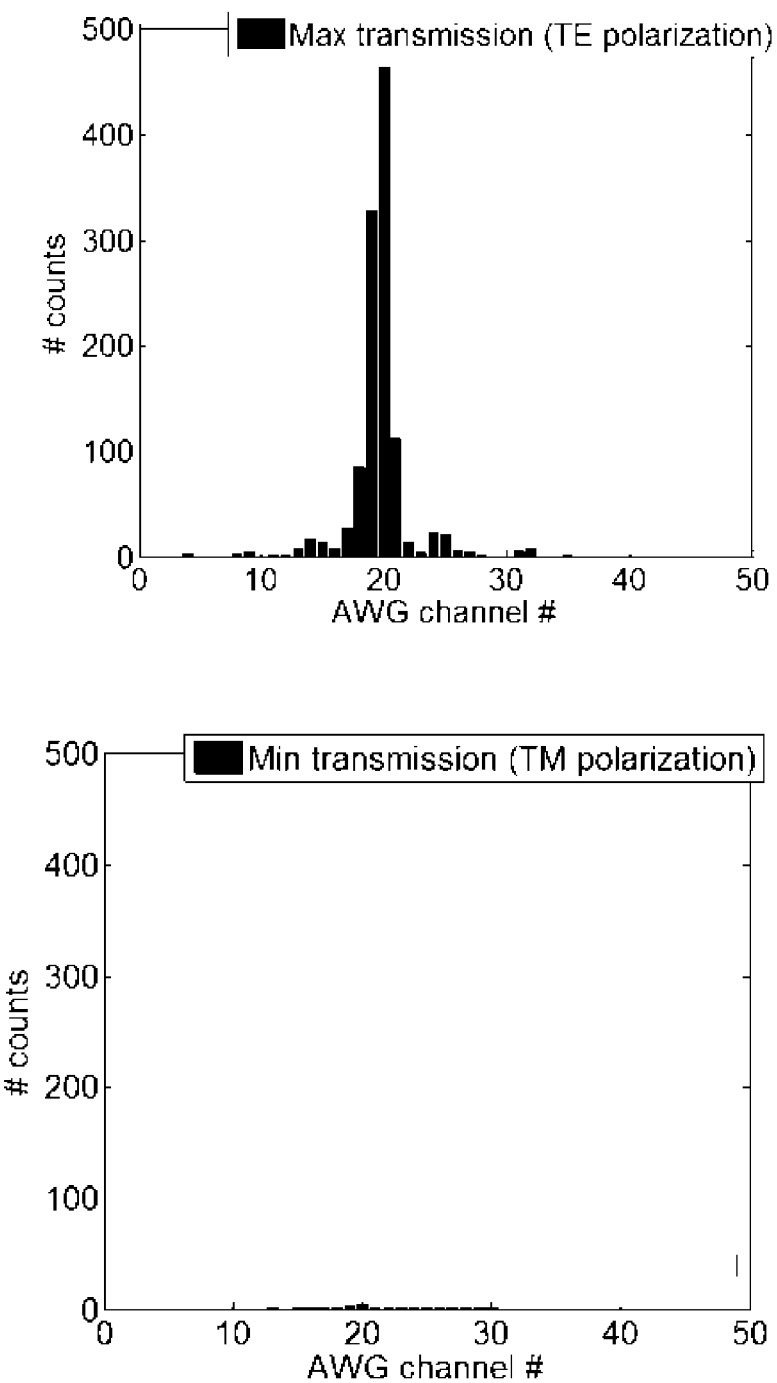
FIG. 7 shows TE and TM transmission characteristics of the fiber Bragg grating interrogator illustrated in FIG. 5, in an example for illustrating embodiments of the present invention.

If no polarization handling strategy is applied, as illustrated in FIG. 5, the system behaviour is strongly polarization dependent. The device was designed for TE polarization, featuring a 1D grating coupler interface also designed for TE polarization. Operation of the device is strongly polarization dependent, as shown in FIG. 7. In order to efficiently couple the signal reflected by the FBG into the PIC, a polarization controller must be inserted before the PIC, which transforms the arbitrarily polarized signal reflected by the FBG into a TE polarized signal.

FIG. 7 shows an exemplary measured system response when the signal reflected by the FBG is TE or TM polarized. If the reflected signal by the FBG is TE polarized a large signal is detected at the detector array, if the transmitted signal it is TM polarized, no signal is detected, and proper operation of the device is lost.

Figure 6:
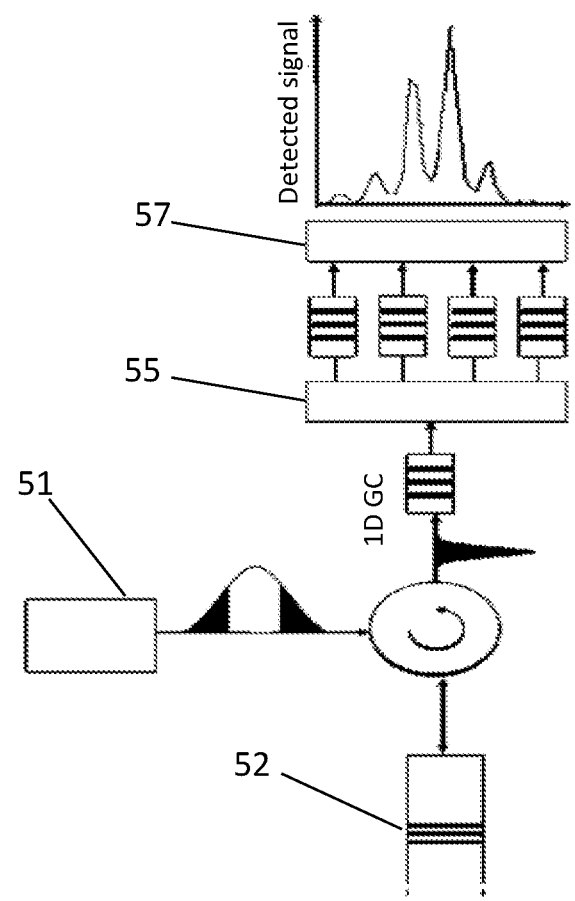
FIG. 6 shows a fiber Bragg grating interrogator operated according to a polarization diversity approach known in the art in an example for illustrating embodiments of the present invention.

A first polarization insensitive design was based on a polarization diversity approach, as known in the art, illustrated in FIG. 6. A 2D grating coupler was used as input interface to the PIC. A 2D grating coupler allows coupling both orthogonal input polarizations into the PIC, automatically splitting them, and rotating one polarization by 90 degrees. Thus, in the end, two TE polarized signals are available at the two output waveguides of the 2D grating coupler. The two orthogonal polarizations were processed independently by two identical replicas of the original design, being the tailored AWG. Hence independently of the polarization status of the FBG reflection, a proper signal is detected at the output of one or both device replicas AWG1 and AWG2, as illustrated in FIGS. 12 to 15.

Figure 8:
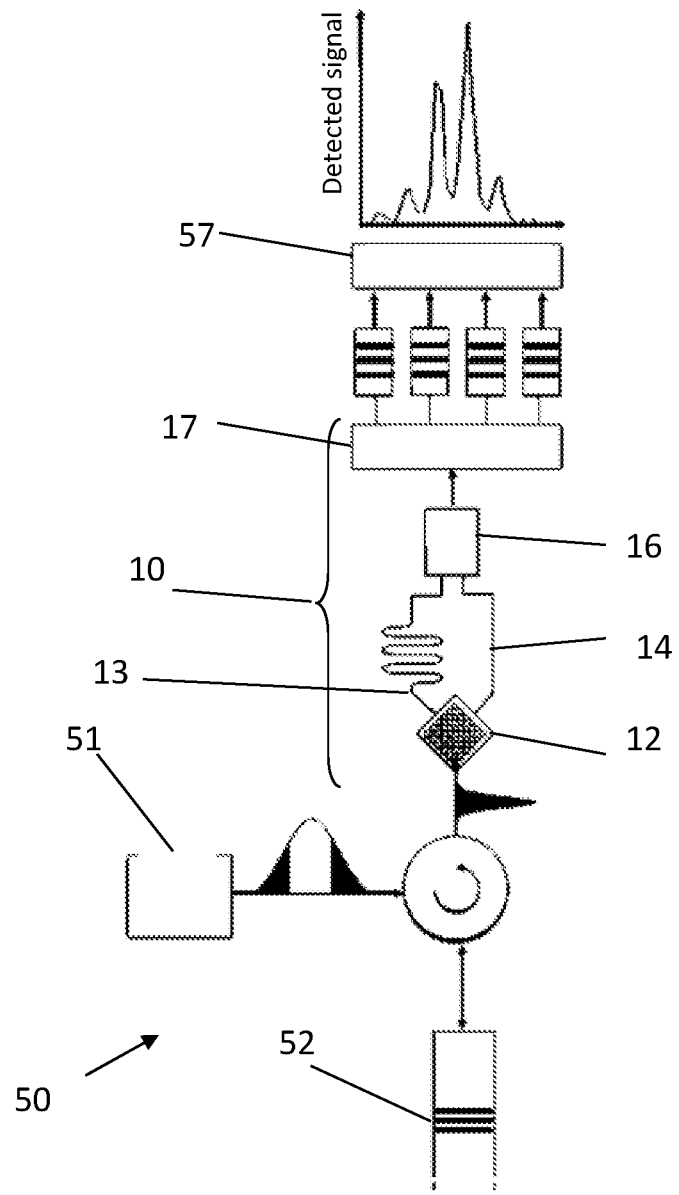
FIG. 8 shows a fiber Bragg grating interrogator operated according to embodiments of the present invention as an illustrative example.

An approach in accordance with embodiments of the present invention, wherein the decohering means comprises two waveguide arms with different length, can be easily applied in the present example since the signal spectral width is of the order of about 0.1 nm. FIG. 8 shows a fiber Bragg grating interrogator operated according to embodiments of the present invention. In this case the signal reflected by the FBG 52, is first transmitted through a Mach-Zehnder interferometer composed of the input 2D grating coupler 12 and a 3 dB MIMI combiner 16, before being injected into the tailored AWG 17. One of the two arms 13 of the Mach-Zehnder is longer than the coherence length of the signal reflected by the FBG and transmitted by the PIC.

Combinations of the two TE signals transmitted by the 2D grating coupler would normally result in interference effects at the output of the 3 dB combiner due to the coherence between the two TE signals, thus the AWG would be fed with an impaired signal and proper operation of the device would be lost.

However, by applying the principle of some embodiments of the present invention whereby one of the two TE signals transmitted by the 2D grating is delayed by a path length longer than the coherence length of the input signal (transmitted by the PIC), no interference effects are observed at the output of the 3 dB combiner. Thus, independently of the polarization status, the input signal is transformed into a TE signal at the expenses of an additional fixed 3 dB loss. The length of the delay path must be longer than the coherence length of the input signal transmitted by the PIC.

Figure 9:
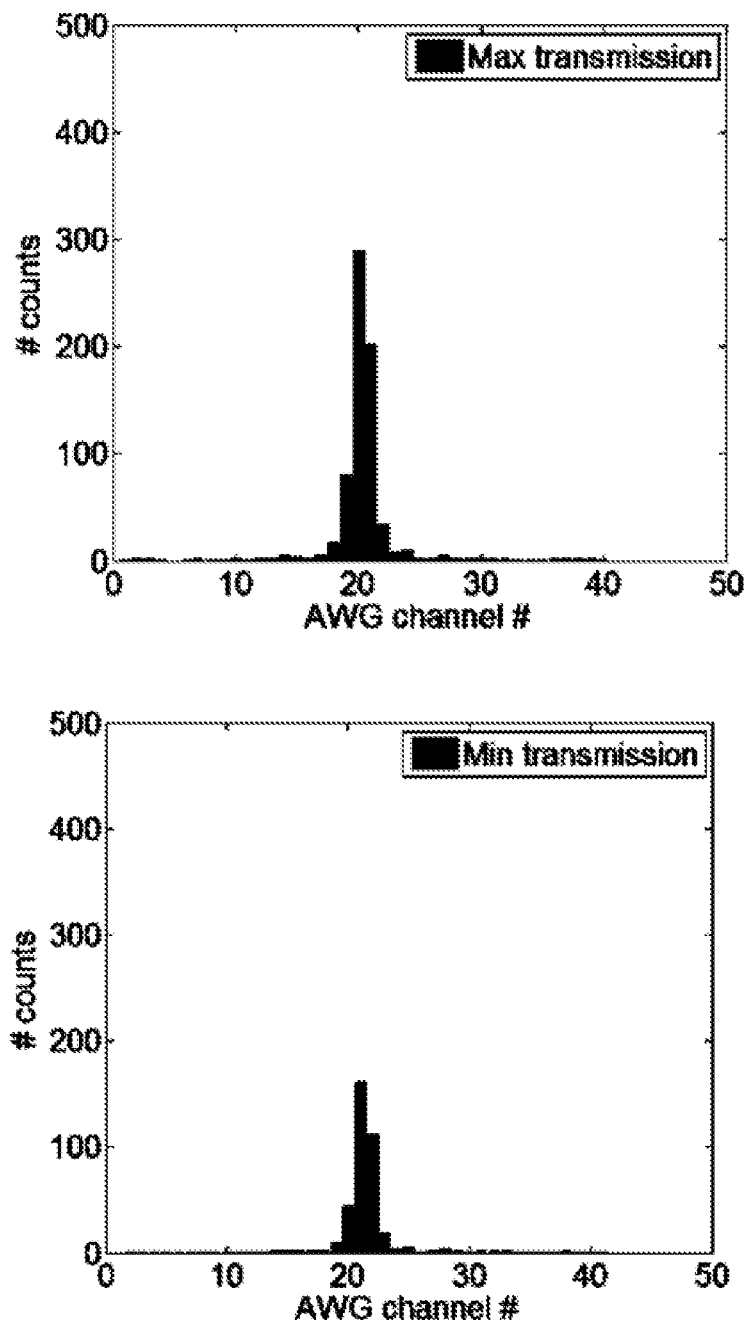
FIG. 9 shows transmission spectra for the minimum and maximum obtained over different polarization states, for the fiber Bragg grating interrogator illustrated in FIG. 8, in an example for illustrating embodiments of the present invention.

The FBG peak had spectral width $\Delta\lambda$=120 µm (FWHM), the corresponding coherence length $L_c$ in the SOI optical waveguide is about 3 mm. This means that the longer delay arm can be reasonably integrated within the SOI PIC, and results in negligible additional propagation losses. The signal measured at the output of the device is presented in FIG. 9, illustrating the PIC response for varying polarization. The worst case and best case are shown. It is evident that the impact of polarization on the interrogator is highly mitigated. Independently of the input polarization status a proper signal can be detected and thus processed. The measured, polarization dependent, transmission non-uniformity is in the order of 2 dB. A small polarization dependent effect remains present, which may be caused by the polarization dependence of the 2D grating coupler. Nevertheless, for any incoming polarization status a proper signal level reaches the detectors, and proper operation of the devices is achieved.

Figure 16:
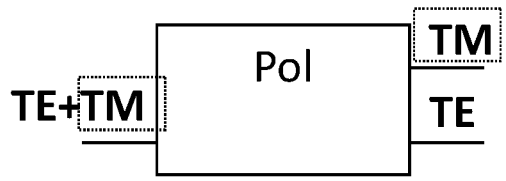
FIGS. 16a-16f illustrates building blocks as can be used in embodiments according to the present invention.
Figure 16:
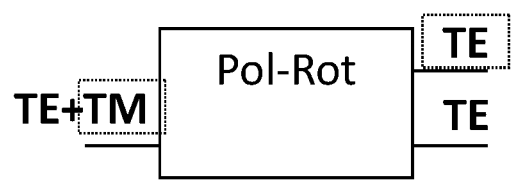
Figure 16:
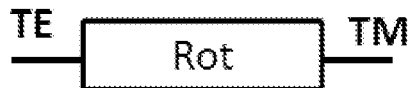
Figure 16:
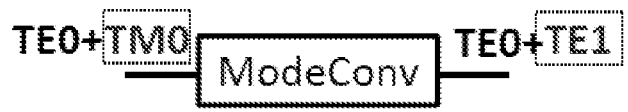
Figure 16:
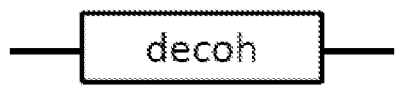
Figure 16:
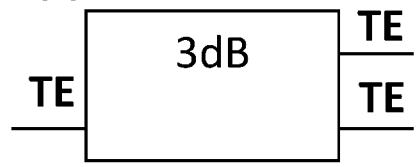
Figure 17:
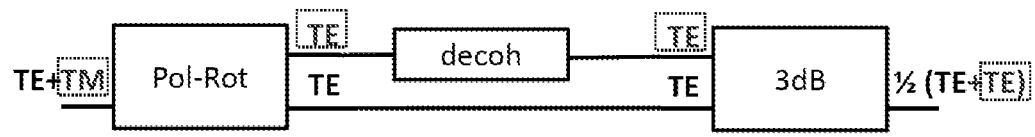
FIGS. 17 to 20 illustrates different designs as can be used in embodiments of the present invention.

By way of illustration, a number of different designs of embodiments of the present invention are shown in FIGS. 17 to X4. FIG. 16 illustrates different building blocks that can be used in designs of embodiments of the present invention are shown. FIG. 16 shows in part (A) a component POL which is a polarization splitter splitting in an incoming beam comprising two different polarized beam parts, e.g. both a TE and a TM polarized beam part, into two different channels, such that in each channel a different polarization is present. An example of a polarization splitter is described in Fukuda et al. Optics Express 14(25) p 12401 (2006). FIG. 16 shows in part (B) a polarization splitter and polarization rotator, such that an incoming beam comprising two different polarized beam parts is split, and the polarization in at least one channel is rotated, such that the same polarization is obtained in both channels. An example thereof is described in Sacher et al. in Optics Express, vol. 22, no. 9, p. 11167, 2014. Another example is illustrated by the on-chip polarization splitter and rotator in Watts et al. in Optics Letters, 30(9), page 937 (2005). FIG. 16 shows in part (C) a rotator, illustrating that a change in polarization can be induced in a channel. Examples of rotators are for example also described in Vermeulen et al. GPF 2010, paper WC6 and in Wang et al. JOSA B, pp 747-753 (2008).

FIG. 16 shows in part (D) a mode convertor, wherein in the present example, a zero-order TM mode is converted into a first order TE mode. FIG. 16 shows in part (E) a decoherence means such as for example a long waveguide or a phase modulator and in part (F) a splitter/combiner is shown.

It is to be noticed that the different designs are by way of example based on edge coupling. Nevertheless, in the designs where a building block POL-ROT is present, this can for example be replaced by a 2D-grating such that coupling at the upper surface can be achieved.

In FIG. 17 a design is shown wherein a beam with two polarization modes TE and TM are received, these are splitted and rotated such that in the splitted channels both a TE and TE mode are present. In one of the channels, the TE mode is then made non-coherent. These non-coherent TE modes are then combined into a single waveguide.

Figure 18:
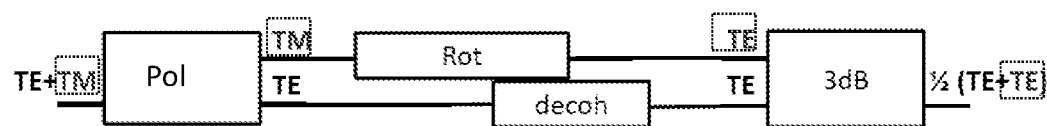

In FIG. 18 a design is shown wherein the polarization splitting is separated from altering one of the polarization states, by first splitting a beam having e.g. a TE and a TM component in separate channels and thereafter, altering the TM mode to a TE mode in the upper channel.

Figure 19:

In FIG. 19 an alternative design is shown for FIG. 18, whereby the change in polarization state is performed in the last building block, after the TE state has been modified by a decoherence means.

Figure 20:

In FIG. 20 a design schematic is shown, wherein the polarization is altered by a mode conversion means from TE0+TM0 to TE0+TE1. The subscript 0, 1 refers to the mode index. The decoherence means in this case is a long, multi-mode waveguide in which the group velocity for the modes T0 and TE1 is substantially different such that after passing through the waveguides the two modes are delayed with respect to each other over a distance longer than the coherence length.

The invention claimed is:

1. A photonic integrated circuit, comprising:
    an input interface configured for receiving an optical input signal and splitting the optical input signal into a first mode signal and a second mode signal respectively corresponding to two distinct polarization modes of the optical input signal,
    a rotator configured for rotating the polarization of at least one of the first mode signal and the second mode signal such as to provide the first mode signal and the second mode signal in a common polarization mode,
    a combiner configured for combining the first mode signal and the second mode signal into a combined signal,
    a processing component comprising a polarization dependent photonic integrated circuit for processing said combined signal,
    a decohering means configured for transforming at least one of the first mode signal and the second mode signal such that the first mode signal and the second mode signal are received by the combiner in a mutually incoherent state, the decohering means comprising a first and a second waveguide, at least one of the first and the second waveguide containing a delay line for inducing a difference in optical path length in the first and the second waveguide by at least a coherence length of the optical input signal,
    the combiner being configured for combining the first mode signal and the second mode signal by coupling the output of the first waveguide and the second waveguide into a waveguide for supplying the combination signal to the processing component.

2. The photonic integrated circuit according to claim 1, wherein the input interface is configured for receiving the optical input signal from an external single-mode optical fiber.

3. The photonic integrated circuit according to claim 1, wherein the input interface comprises a 2-dimensional diffraction grating structure.

4. The photonic integrated circuit according to claim 1, wherein the first waveguide and the second waveguide configured for respectively conducting the first mode signal and the second mode signal in said common polarization mode, the first waveguide and the second waveguide differing in optical path length by at least a coherence length of the optical input signal.

5. The photonic integrated circuit according to claim 1, further comprising an output interface configured for coupling an output signal provided by the processing component out of the photonics integrated circuit.

6. The photonic integrated circuit according to claim 1, wherein the
    decohering means comprises a phase modulator configured for modulating the phase of one of the first mode signal and the second mode signal at a rate higher than a predetermined detection bandwidth for sampling an output signal provided by the processing component.

7. The photonic integrated circuit according to claim 1, wherein the combiner comprises a 3dB coupler adapted for combining the first mode signal and the second mode signal into the combined signal.

8. The photonic integrated circuit according to claim 7, wherein the rotator is part of the input interface or the 3dB coupler.

9. A photonic integrated circuit, comprising:
    an input interface configured for receiving an optical input signal and splitting the optical input signal into a first mode signal and a second mode signal respectively corresponding to two distinct polarization modes of the optical input signal,
    a rotator configured for rotating the polarization of at least one of the first mode signal and the second mode signal such as to provide the first mode signal and the second mode signal in a common polarization mode,
    a combiner configured for combining the first mode signal and the second mode signal into a combined signal,
    a processing component comprising a polarization dependent photonic integrated circuit for processing said combined signal,
    a decohering means configured for transforming at least one of the first mode signal and the second mode signal such that the first mode signal and the second mode signal are received by the combiner in a mutually incoherent state, the decohering means comprising a first and a second waveguide, at least one of the first and the second waveguide containing a phase modulator configured for modulating the phase of one of the first mode signal and the second mode signal at a rate higher than a predetermined detection bandwidth for sampling an output signal provided by the processing component,
    the combiner being configured for combining the first mode signal and the second mode signal by coupling the output of the first waveguide and the second waveguide into a waveguide for supplying the combination signal to the processing component.

* * * * *